(12) United States Patent
Subbloie et al.

(10) Patent No.: US 11,031,763 B2
(45) Date of Patent: Jun. 8, 2021

(54) NANOWIRE BASED ELECTRICAL CONTACT SYSTEM

(71) Applicants: Albert Subbloie, Orange, CT (US); Kenneth Buda, Scarsdale, NY (US)

(72) Inventors: Albert Subbloie, Orange, CT (US); Kenneth Buda, Scarsdale, NY (US)

(73) Assignee: Budderfly, Inc., Shelton, CT (US)

( * ) Notice: Subject to any disclaimer, the term of this patent is extended or adjusted under 35 U.S.C. 154(b) by 282 days.

(21) Appl. No.: 15/918,559

(22) Filed: Mar. 12, 2018

(65) Prior Publication Data

US 2018/0261989 A1 Sep. 13, 2018

Related U.S. Application Data

(60) Provisional application No. 62/469,837, filed on Mar. 10, 2017.

(51) Int. Cl.
| | |
|---|---|
| *H01B 7/30* | (2006.01) |
| *H01B 11/02* | (2006.01) |
| *H02B 1/20* | (2006.01) |
| *H02G 5/06* | (2006.01) |
| *H02G 3/30* | (2006.01) |
| *H04W 4/80* | (2018.01) |
| *H02M 3/335* | (2006.01) |
| *H01B 1/02* | (2006.01) |
| *H01B 13/00* | (2006.01) |
| *H05B 45/385* | (2020.01) |

(52) U.S. Cl.
CPC ............... *H02G 3/30* (2013.01); *H04W 4/80* (2018.02); *H01B 1/02* (2013.01); *H01B 13/0036* (2013.01); *H02M 3/33507* (2013.01); *H05B 45/385* (2020.01)

(58) Field of Classification Search
CPC .......... H02G 3/30; H04W 4/80; H05B 45/37; H02M 3/33507; H01B 1/02; H01B 13/0036; H01B 7/0846; H01B 7/0815; Y10S 977/762; H01L 29/413
See application file for complete search history.

(56) References Cited

U.S. PATENT DOCUMENTS

| | | | | |
|---|---|---|---|---|
| 5,394,289 A | * | 2/1995 | Yao | H01H 71/122 337/239 |
| 2009/0275280 A1 | * | 11/2009 | Liang | F04D 29/58 454/258 |

(Continued)

OTHER PUBLICATIONS

Naveen Noah Jason, Wei Shen, Wenlong Cheng, Copper Nanowires as Conductive Ink for Low-Cost Draw-On Electronics (Year: 2015).*

(Continued)

*Primary Examiner* — Hal Kaplan
*Assistant Examiner* — Rasem Mourad
(74) *Attorney, Agent, or Firm* — St. Onge Steward Johnston & Reens, LLC

(57) ABSTRACT

An electrical connection and control system is provided including a power source configured to provide a direct current output and an electrically powered element configured to receive power from the power source. The power is supplied via strips of nanowire material applied upon a surface. Controllers are provided to control the electrically powered elements via switches and/or via network connections.

29 Claims, 10 Drawing Sheets

(56) References Cited

U.S. PATENT DOCUMENTS

| | | | | |
|---|---|---|---|---|
| 2010/0118464 | A1* | 5/2010 | Matsuyama | H01L 21/6833 361/234 |
| 2010/0170616 | A1* | 7/2010 | Boss | H01B 7/0846 156/71 |
| 2013/0099666 | A1* | 4/2013 | Stuffle | G09F 9/33 315/52 |
| 2016/0329710 | A1* | 11/2016 | Clifton | H02J 3/32 |

OTHER PUBLICATIONS

Lucy, Introducing The Amazing, Electrically Conductive Paint Pen (Year: 2015).*

* cited by examiner

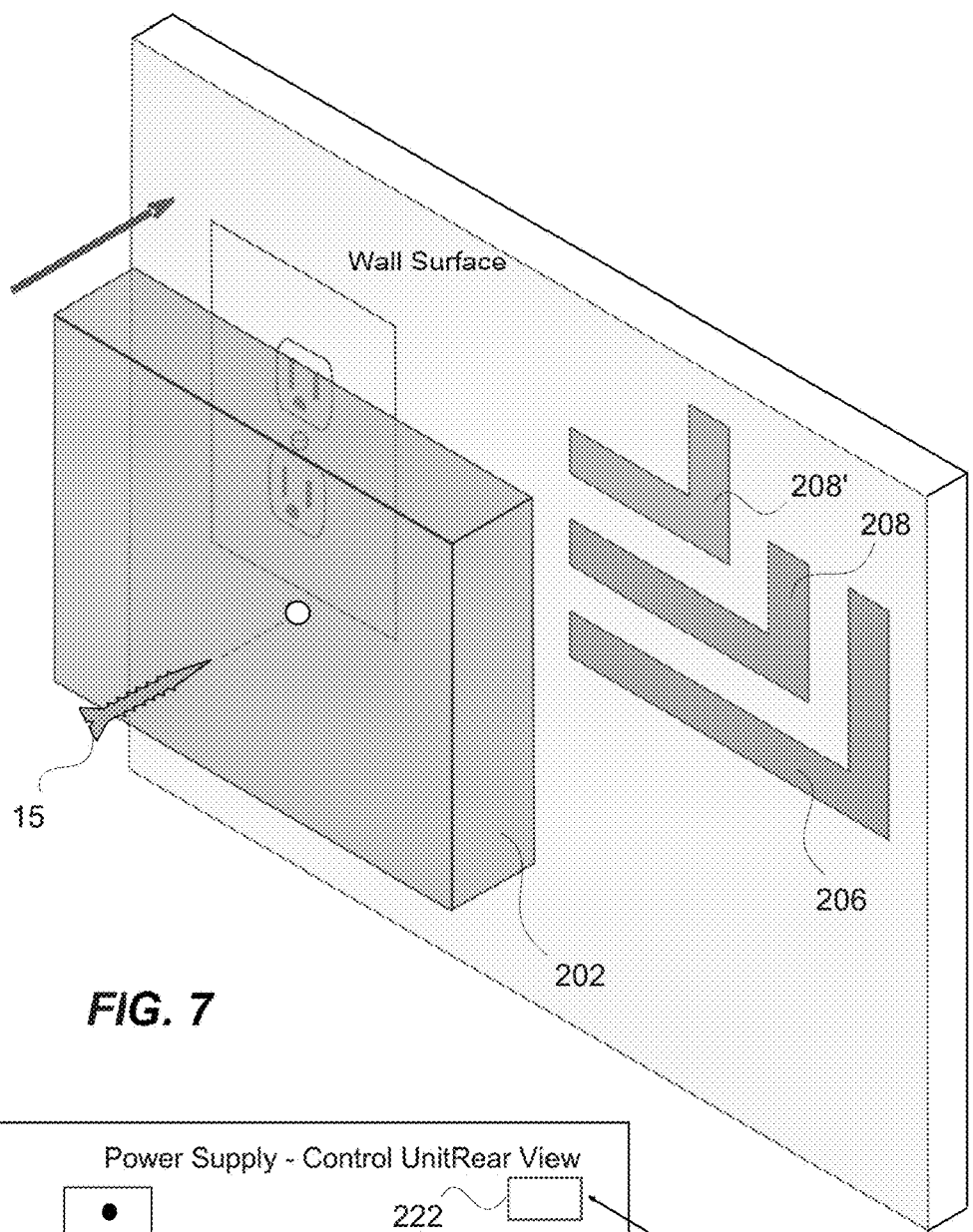
FIG. 7
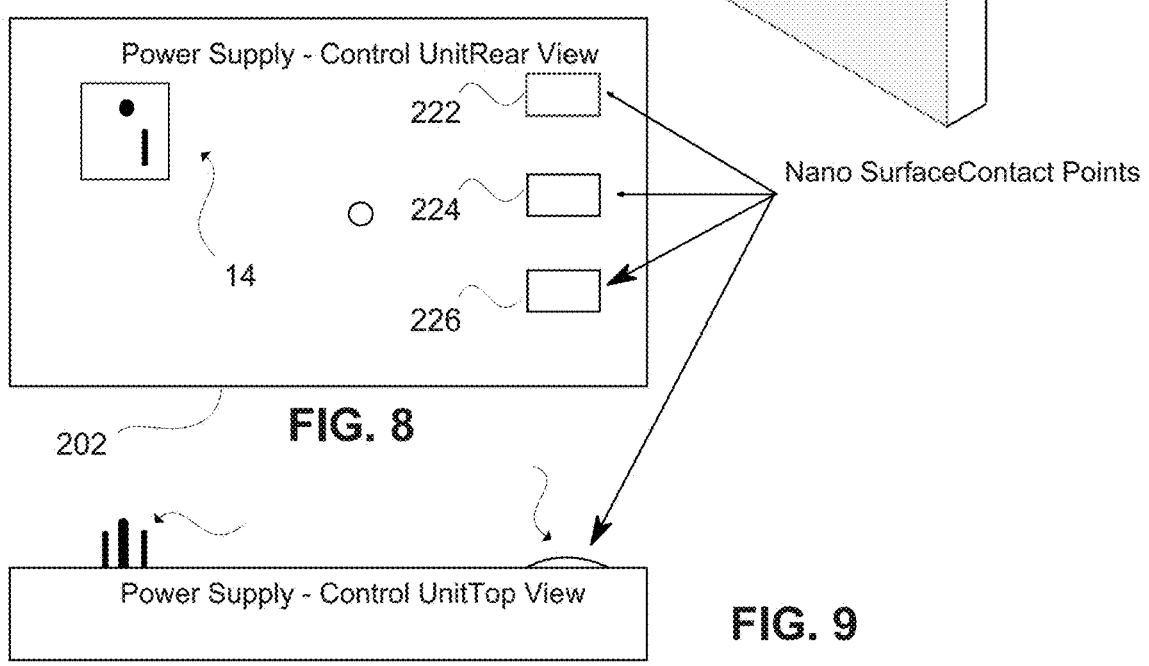
FIG. 8
FIG. 9

NANOWIRE BASED ELECTRICAL CONTACT SYSTEM

FIELD OF THE INVENTION

An electrical distribution system and method for operating a variety of electrical devices. More particularly, the system relates to nanowire based coatings that are used to transmit electrical power to various electrical devices throughout a space.

BACKGROUND OF THE INVENTION

Current methods of transmitting and distributing electrical power in a building or otherwise, are traditionally done via electrical wiring (e.g., copper or aluminum). Electrical wires may comprise either solid or stranded wires twisted together and are typically encased in a plastic insulating material and may further include a nylon coating around the exterior of the plastic insulating material. These wires are connected to a panel board that includes a circuit breaker for power distribution in the area of the panel board (e.g., in office buildings this could be by floor and so on).

Most devices that are adapted to be powered by AC power are designed to interface with three electrical connections. For typical power requirements in the United States where the AC power is approximately 120 V 60 Hz, this would include, one ground wire (typically green in color), one neutral wire (typically white in color) and one power or "hot" wire (typically black in color). In DC power applications, DC powered devices typically use two wires, one positive (typically red in color) and one negative (typically black in color). In applications where the DC power is relatively low voltage (e.g., 48V DC or lower), a ground wire is often omitted.

In summary, to properly power an electrical device, it is necessary for two electrical paths to be provided, which comprise a positive and negative in DC applications. One path acts as the transmission path to the connected device and the other path acts as a return path from the connected device.

However, the present method of distributing electrical power in structures requires these electrical wires to actually be run to the physical location of the device that is being powered or to point where it can be connected to the device. This can be cumbersome and inflexible especially in retrofit installations. Commercial, residential and industrial construction is designed to support electrical distribution throughout a building, structure or facility. This includes the provision for light fixtures, switches/sensors, receptacles/ outlets and HVAC to name a few. Typically electrical power companies will transmit AC power over transmission lines, but this can be transformed to a lower AC voltage for end use. Additionally, the lower AC power can then be converted to DC power at end use points for particular devices such as, computers, handheld devices and tablets, and LED lighting.

As technology develops toward relatively low power consumption devices and systems, more and more systems are utilizing low voltage DC power for more and varied applications. While AC power distribution continues to be standard for electrical power distribution, the shift to using more and more DC power for actual power consumption has led to an increase in power losses associated with the conversion process. It is estimated that 5-10% of power is lost during the conversion process from AC to DC. One has only to touch the power adapter to their tablet device or mobile phone and feel how hot those devices get to understand that a considerable amount of power is wasted and expelled as heat in the conversion process. The amount of power drawn by a DC converter (even when the device is not in use—e.g., in standby mode) can be considerable over time and is sometimes referred to as "vampire draw", which refers to the way electric power is consumed by electronic device in standby mode.

Another problem with current power distribution systems is that all of the electrical wiring is installed prior to completed construction and now resides inside the walls of each space and in the ceilings and floors. While this protects the wiring from most damage, it also functions to make the wiring inaccessible. While some existing wiring could be repurposed to support DC power distribution, this concept is typically discarded due to the extreme difficulty of needing to access and move the wiring to a new desired location.

Accordingly, a major problem with current wiring distribution systems is the inflexibility of standard electrical wires positioned with the walls or other structures of a building, structure or complex. When a device needs to be added, or moved to a different location, wiring needs to be installed within the walls or ceiling or floor to allow this to happen. This can be very disruptive to the working environment as the walls and ceiling or floor are opened up and the wiring is installed. Even in new construction, the amount of time that is required and scheduling needed to ensure all the wiring is "roughed in" prior to the walls being closed up with sheetrock or the like, can introduce significant delays to the construction schedule. To compound this, a specific electrical inspection of the "roughed in" wiring will typically need to happen prior to the sheetrock being installed adding still more time to the construction schedule. In certain commercial and industrial installations, building codes require electrical wiring to be enclosed in metal conduit adding even further cost and complexity to the installations.

In another application, Printed Circuit Board (PCB) technology is a standard for many electronics manufactured today to distribute power and control to the components within the device itself. Typically a plastic flat panel is coated with copper (or other material) on either one side or both sides. The wiring diagram is etched by a machine, which covers the desired matrix of wiring connections on the flat surface, and a special acid is used to remove the copper around the desired connection paths resulting in a micro created wiring schematic. In many cases, many multiple layers can be created with two sides creating hundred or sometime thousands of electrical connections with the remaining connections between components required for the device function properly.

However, the process of etching utilizes a caustic chemical to remove the unwanted material to leave only the intended electrical connections in place. It is contemplated that a process that only adds what is desired could reduce the need for using removal chemicals.

SUMMARY OF THE INVENTION

What is desired then is a system and method for distributing DC power that does not require wires to be installed inside of the walls, ceiling or floor of a structure or complex.

It is desired to provide a system and method for distributing DC power that may be installed after the walls, ceiling and floor are installed without the need of opening these up or slowing down construction schedules.

It is further desired to provide a system and method for distributing DC power that may be readily retrofitted into an existing structure or complex without the need for accessing the interior of walls, ceiling or floor.

It is also desired to provide a system and method for distributing DC power that allows for quick and easy relocation of DC power distribution points without the need of performing invasive construction in a structure or complex.

These and other objects are achieved in one configuration by the provision of an AC/DC converter that is adapted to be plugged into a standard three-prong electrical wall outlet. The AC/DC converter includes two contacts that are each adapted to engage with a DC current path (positive and negative) for the transmission of DC power to a device connected to the DC current path. The DC current path is formed by silver nanowire that is applied to a surface on which the AC/DC converter is mounted. The silver nanowire is applied to the surface as a paint that is formed from the contact point of the AC/DC converter and extends to a point where a DC powered device is to be located.

Nanowire based coatings can be used to wire various electrical components and various control systems can be used to more efficiently control such components. Examples of nanowire heating elements as well as electrical usage control systems are disclosed in Application Ser. No. 62/400,772 ("Multi Sensor Pack and Control of Energy Consumption Devices") and 62/424,765 ("Nanowire Coating For Heating And Insulation"). The content of these two applications are incorporated by reference herein by reference.

Silver nanowire is a virtual painted/layered/coating that can effectively be used to conduct electrical current from a source of power (e.g., a wall-mounted outlet), to a desired location. Two strips (positive and negative) of painted nanowire can be applied to the surface of walls, ceilings, circuit boards, or on virtually any surface to connect power to devices. Each strip is run either parallel or a distance from one another, one functioning as a positive conductor and the other functioning as a negative conductor. This configuration is especially well-suited to transmit DC current at a low voltage (e.g., 24V or 48V). While it is understood that silver nanowire could effectively be used to transmit AC power, the application will focus on the transmission of DC current.

The implications of this painted on wiring approach provides a degree of flexibility that as yet, has never been possible for positioning of DC powered devices throughout a space. Walls, ceilings and floors need not be opened to run or change or access wires with this approach. Nanowires can be run along the surface of walls within a room in an almost invisible manner to distribute DC power. Given the low-voltage approach of DC, the risk of shock is reduced or eliminated when compared with AC power. Additionally, potential fire hazards would be dramatically reduced.

In one example, the DC powered device could comprise an LED light fixture that is mounted on a wall or on a ceiling. In this instance, the DC current path could be "painted" onto the surface of the wall and extends from a wall-mounted outlet, vertically up the surface of the wall and, if needed, laterally to a desired location for the LED light fixture. The AC/DC converter would be plugged into the wall-mounted outlet and the contacts would engage with the painted on DC current path such that DC power is then transmitted from the AC/DC converter through the contacts to the silver nanowire making up the DC current path and to the LED light fixture. This would not require opening up the wall or any invasive construction to install the lights. The silver nanowire could, if desired, be extended onto the surface of the ceiling enabling the mounting of a ceiling mounted LED light fixture. The LED light fixture would be provided with two contacts that are designed to engage with the silver nanowire to provide power to the light fixture. In the event that a light fixture needs to be relocated or moved, it is simple to just extend the DC current path by painting the silver nanowire to the new location. Once the light fixture location is identified and the silver nanowire is painted to the proper location(s), an insulating paint can be applied over top of the silver nanowire. The wall can then be painted with any type or color paint as desired.

In another configuration, a wall switch could be coupled to one of the wall-mounted receptacle outlets such that, in the installation described above, the lights would remain in the Off state until a user turned the light switch On, which would function to apply AC power to the wall-mounted receptacle thereby turning on the AC/DC converter and the LED light fixture. In that type of configuration, any "vampire draw" for the AC/DC converter would be eliminated because no AC power would be provided to the AC/DC converter and therefore the device would be Off rather than in Standby mode.

In the example of manufactured electronic components, a new process can be created to simply run the micro thin layers, which can be applied like a paint or printed coating to connect components in a device or appliance. The tedious method of acid removing thin solid copper coatings to result in a wired result can be completed more efficiently. The acid material used in this traditional process is also environmentally hazardous, and can be reduced dramatically. While there are many advantages to this new nano-connected approach, two more noteworthy ones are that less space is required for the painted on wired approach; and second, fewer connection problems can occur based on any wires detaching given no solid wires or connections are used. The cost of manufacturing should also be lower as the connections could be painted as opposed to being assembled or acid-etched.

Another benefit of the system is that it enables new energy technology building improvements to be completed more quickly and easily than ever before. For example, the retrofitting of LED lighting in the space. The configuration also allows for an alternative to the current method of wiring almost anything to a source of power. For example, newer printed flat LED lights are relatively new. The nanowire solution allows the LED print sheets to be applied on the surface of the ceiling or wall, without the need to penetrate the surface. Other benefits include enabling the closure of openings that are required by current light fixture designs (e.g., current light fixtures require a penetration through the wall/ceiling to feed power to the light fixture). The elimination of openings in the ceiling/walls will provide a higher insulation envelope in the building itself, providing energy savings relating to heating and cooling.

Still another benefit of this type of system is that it allows for a simple and low cost method to convert a space from using AC power to DC power. There has been debate over the last few years on this subject on the subject of converting spaces from AC power to DC power in view of the electronics revolution as well as the newest LED lighting technology. It is conceived that the amount of energy loss occurring due to the conversion of AC power to DC power could be greatly reduced if the conversion step were greatly reduced or eliminated altogether. This is especially true in locations where renewable technologies, such as solar power, natively produce DC power. This DC power is converted to AC power, which is distributed throughout the structure or facility and is then re-converted to DC power when a person plugs in a computer, or a mobile phone, or a tablet, or LED light fixtures, or any one of the myriad of devices that use DC power today. On top of this waste due to multiple layers of power conversion, it is estimated that as much as 20% of the cost of solar panels installations are due to the specialized inverters needed to convert the DC power to AC power to enable a connection to the facilities electrical distribution panels. However, this power is then just converted back to DC at the room level when utilized in the space. As was stated previously, one only has to physically touch a power adapter to feel the heat to understand just how much power is dissipated and wasted in the conversion process.

In one configuration, it is contemplated that the building or facility could provide for DC power distribution for natively generated DC power from, for instance, solar panels. The system could enable the building to be converted to or at least provide for some direct DC power outlets, without an expensive and intrusive wiring modification. It may be possible to provide a direct DC connection into each room space from Solar or Battery storage, and remove the multiple conversions. This means a local solar solution can stay in natively produced DC form to be directly connected to the space. The energy savings on eliminating these conversion could reduce costs energy losses by 20-30%.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one configuration a system for distributing DC power is provided comprising a power source adapted to provide a Direct Current (DC) output to a device that is adapted to receive DC power from the power source. The system further comprises a first conductive current path extending from the power source to a connection area near the device adapted to receive DC power, the first conductive current path comprising a nanowire material applied upon a surface and a second conductive current path extending from the power source to the connection area near the device adapted to receive DC power, the second conductive current path comprising a nanowire material applied upon a surface. The system is provided such that the first and second conductive current paths are maintained physically apart from each other and the power source adapted to be connected to the first connection area and the device adapted to be connected to the second connection area such that DC power is supplied to the device via the first and second conductive current paths.

In another configuration a method of controlling an electrical power and distribution system is provided comprising the steps of providing a liquid material comprising nanowires and applying the liquid material to a surface in a pattern including at least first and second conductive current paths that are spaced apart and extend from a first connection area to a second connection area. The method further comprises the steps of connecting electrical contacts of a power source to the first and second conductive current paths at the first connection area, connecting electrical contacts of a device to the first and second conductive current paths at the second connection area and transmitting electrical power from the power source to the device.

In still another configuration a system for distributing DC power is provided comprising a power source adapted to provide electrical power to a device that is adapted to receive electrical power and a first conductive current path extending from a first connection area near the power source to a second connection area near the device, the first conductive current path comprising a silver nanowire material applied upon a surface. The system further comprise a second conductive current path extending from the first connection area to the second connection area, the second conductive current path comprising a silver nanowire material applied upon the surface. The system is provided such that the power source is adapted to be connected to the first connection area and the device is adapted to be connected to the second connection area such that electrical power is supplied to the device via the first and second conductive current paths.

Other objects and the particular advantages thereof will be apparent upon consideration of the following description and drawings.

BRIEF DESCRIPTION OF THE DRAWINGS

FIG. 7 is a perspective view of the contact system of FIG. 4 connected to a wall socket.

FIG. 8 is a rear view of an exemplary power supply for the electrical contact system of FIG. 4.

FIG. 9 is a top view of FIG. 8.

DETAILED DESCRIPTION OF THE INVENTION

Figure 1:
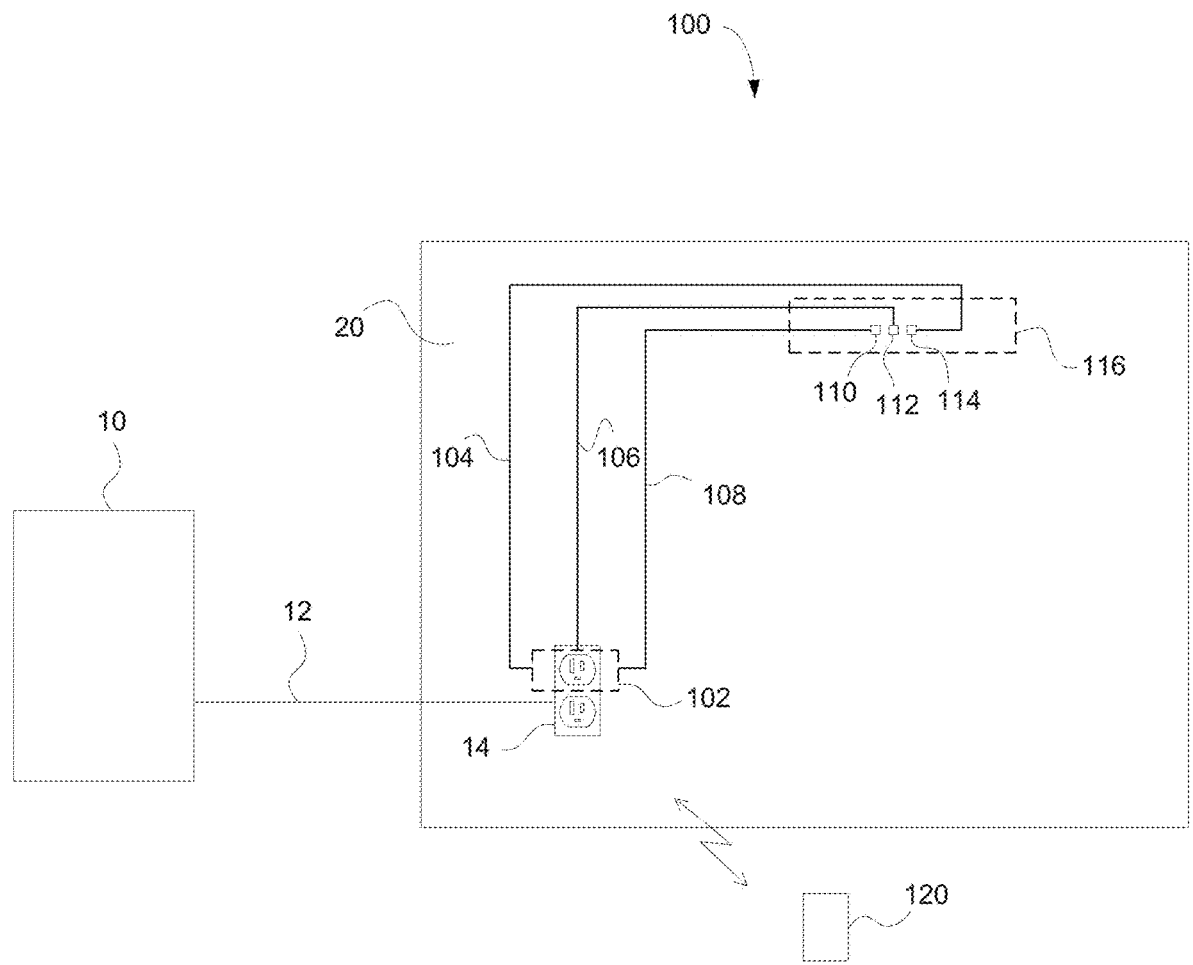
FIG. 1 is a diagram of one configuration of a system for distribution of DC power utilizing the silver nanowire distribution system.

Referring now to the drawings, wherein like reference numerals designate corresponding structure throughout the views. The following examples are presented to further illustrate and explain the present invention and should not be taken as limiting in any regard.

FIG. 1 is directed to a system 100 for distributing low voltage DC power. In this configuration, an electrical panel board 10 provides electrical power to a wall-mounted electrical outlet 14 mounted on a surface 20 via an electrical cable 12. For this illustration, the surface may be considered an interior wall surface, however, it is contemplated that surface 20 could comprise virtually any relatively flat surface such as a ceiling or floor or a partial wall.

A controller 102, which may comprise an AC/DC converter is designed to plug into electrical outlet 14. Also shown in FIG. 1 are DC current path 104, DC current path 106 and DC current path 108. DC current path 108 is adapted to function as a first positive DC voltage line and DC current path 106 is adapted to function as a second positive DC voltage line. DC current path 104 is adapted to function as a negative DC voltage line for both of the positive DC voltage lines. Accordingly, it is contemplated that DC current path 104 may be larger than either DC current path 106 or DC current path 108 to account for the additive current effect from both of the positive DC voltage paths returning on the same line.

Also shown in FIG. 1 are contact point 110 associated with DC current path 108, contact point 112 associated with DC current path 106 and contact point 114 associated with DC current path 104. A device 116 adapted to be connected to the contact points may be mounted to surface 20 and connected to receive the DC power.

In one configuration, device 116 may comprise an LED light fixture that is adapted to receive a DC voltage input signal. While two positive DC voltage paths are depicted in FIG. 1, it is contemplated that only one of the positive DC voltage paths may be used for turning on all the LED lights in the fixture. Alternatively, both of the positive DC voltage paths could be used such that a first grouping of LED lights in the fixture on controlled by a signal sent on the first positive DC voltage path and a second grouping of LED lights in the fixture on controlled by a signal sent on the second positive DC voltage path.

Also shown in FIG. 1 is wireless device 120 that is adapted to communicate with controller 102. Wireless device 120 could be a dedicated wireless device specifically designed for sending control signals to controller 102, or wireless device 120 could be a mobile phone, such as a smart phone, with an app that is used to interface with and control controller 102. In the event that device 116 comprises an LED light fixture, it is conceived that wireless device 120 could be used to set the brightness and/or the color of the LED light fixture for RGBW LED light fixtures. In another configuration, wireless device 120 could have preset scenes saved thereon such that a user need only select one of the preset scenes to set the brightness and color of the LED light fixture. The wireless connection could comprise, for example, a Bluetooth connection or the like.

It is contemplated that the DC current paths 104, 106, 108 could be formed of a silver nanowire material. The silver nanowire material is applied to surface 20 as a liquid material and will cure or dry over time. After the silver nanowire material has cured or dried, an insulating material could be applied or painted over top of the DC current paths 104, 106, 108. Finally, a finish paint could be applied over the surface to provide a finished look and feel to the surface.

It was discovered during testing that the system efficiency and conductivity of the silver nanowire material can be improved $_{[JL1]}$ by the application of a DC current to the liquid silver nanowire material prior to the material fully curing or drying. Additionally, it was observed that the application of heat to the newly silver nanowire via, for example, a heat gun, improved the system efficiency. Accordingly, it is advantageous, especially in applications where radiant heating is used and significant electrical power is needed to be transferred, to apply a DC current to the DC current paths after the liquid silver nanowire material is applied to the surface and or apply heat to the conductive paths, but prior to the liquid silver nanowire material fully curing or drying.

Figure 2:
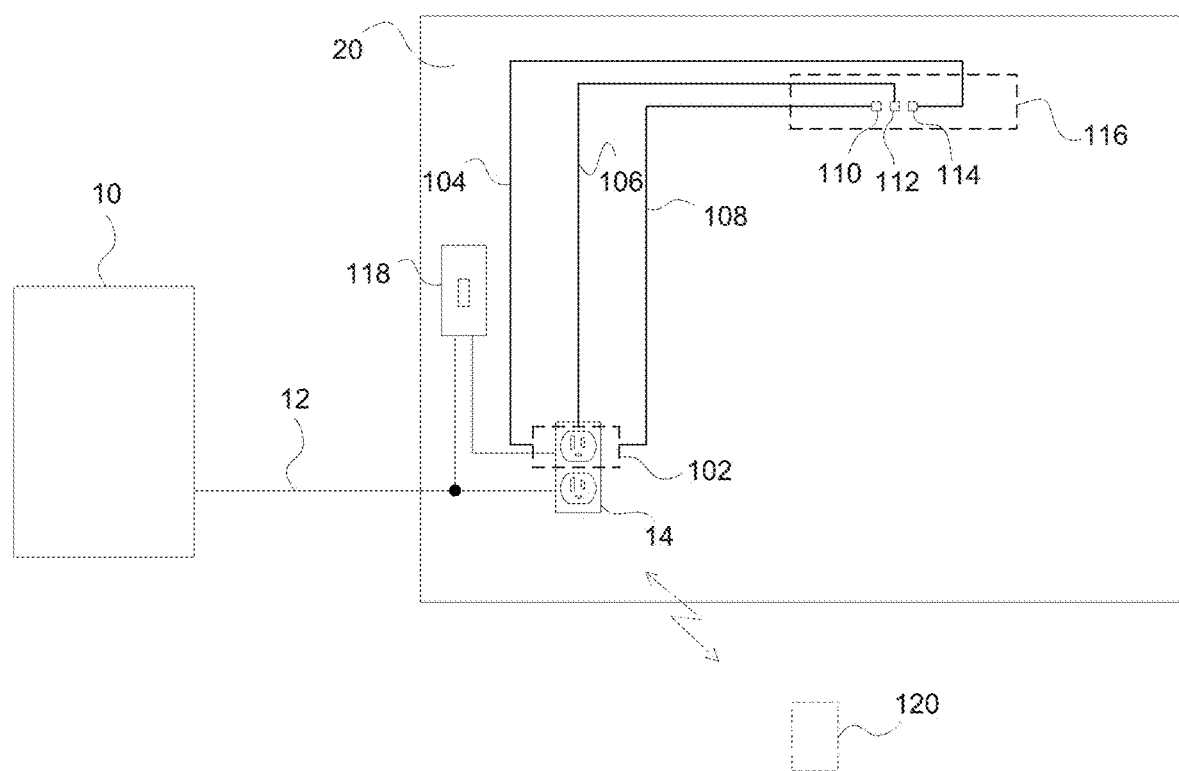
FIG. 2 is a diagram according to FIG. 1 showing and alternative configuration.

Turning now to FIG. 2 an alternate configuration is shown that is similar to that shown in FIG. 1. However, rather than being controlled by a wireless device 120 or possibly in addition to be controlled by wireless device 120, the system 100 is provided with a switch 118. Switch 118 may be any standard type of wall-mounted switch, such as a toggle switch or rocker switch, and is designed to turn AC power On/Off to the upper receptacle of electrical outlet 14. In this configuration, electrical power can be completely shut off to controller 102 until the switch 118 is turned to the On position. When switched On, controller 102 can then convert the AC power to DC current to turn on the connected device 116. Optionally, device 116 could be controllable via wireless device 120 as described in connection with FIG. 1.

A benefit of this configuration is that when switch 118 is in the Off position, no electrical power is transmitted to controller 102 such that no "vampire draw" can occur in relation to controller 102.

Figure 3:
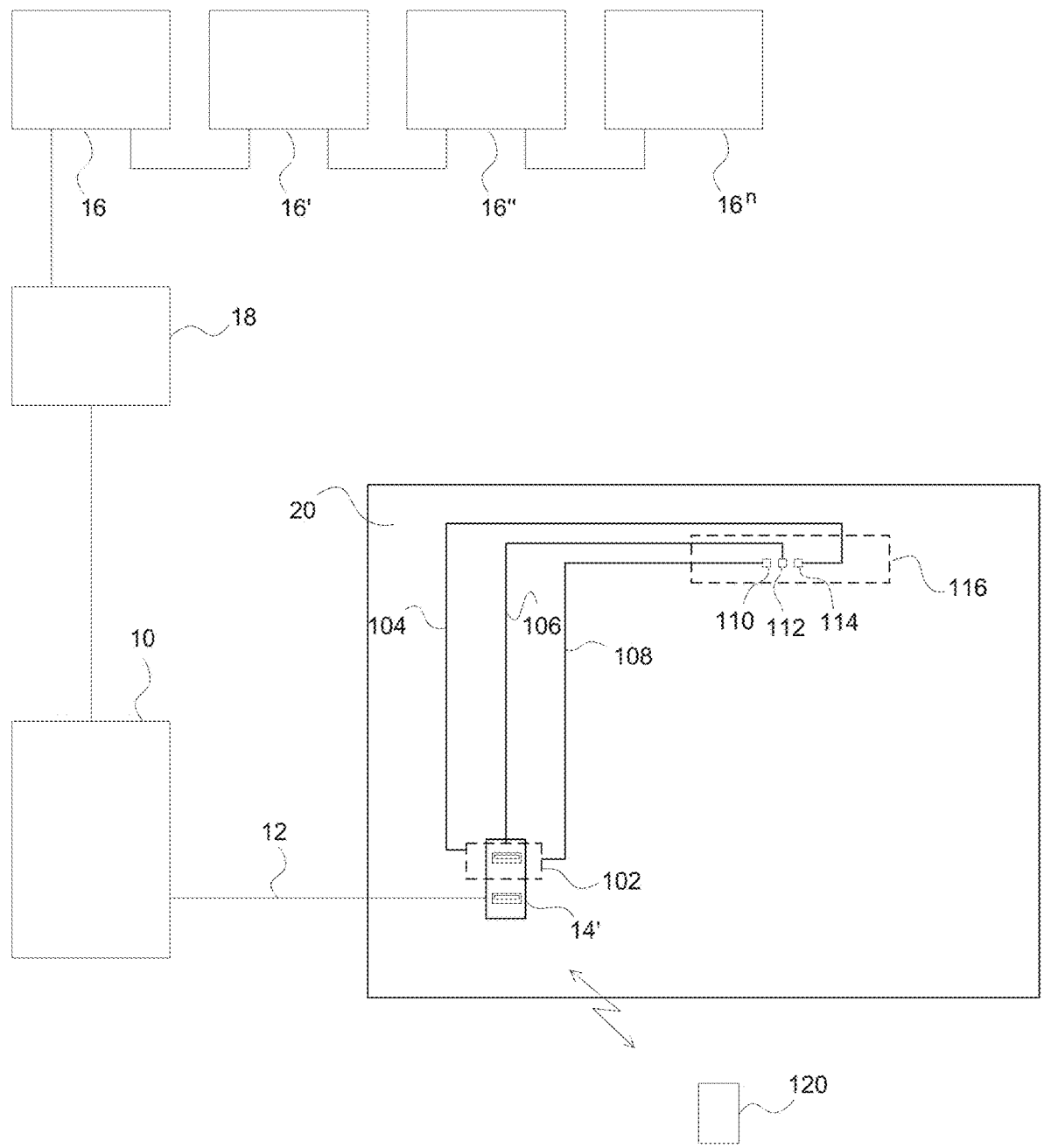
FIG. 3 is a diagram according to FIG. 1 showing and alternative configuration.

FIG. 3 is similar to the configuration depicted in FIG. 1 however, further included are renewable power equipment 16, 16', 16", 16''' and conversion/distribution equipment 18. In this configuration DC power is natively generated by renewable power equipment 16, 16', 16", 16''', which could comprise, for example, solar panels. The DC power is conditioned by conversion/distribution equipment 18 and transmitted to electrical panel board 10 for direct DC power distribution to a space. This configuration is especially efficient due to the fact that no AC to DC power conversion is required. It is contemplated that both AC and DC power could be distributed in parallel in a building, space or facility such that devices the utilize DC power could be directly connected to DC outlets and AC powered device could be connected to the AC powered outlets.

It is noted that while LED light fixtures were discussed in connection with FIGS. 1-3 when discussing device 116, it is contemplated that many different types of devices could be used that run on DC power. For example, radiant heaters (FIG. 4) that run on DC power could be located and placed on surface 20. This is highly efficient when these types of heaters are placed on exterior walls helping to create a thermal barrier.

Figure 4:
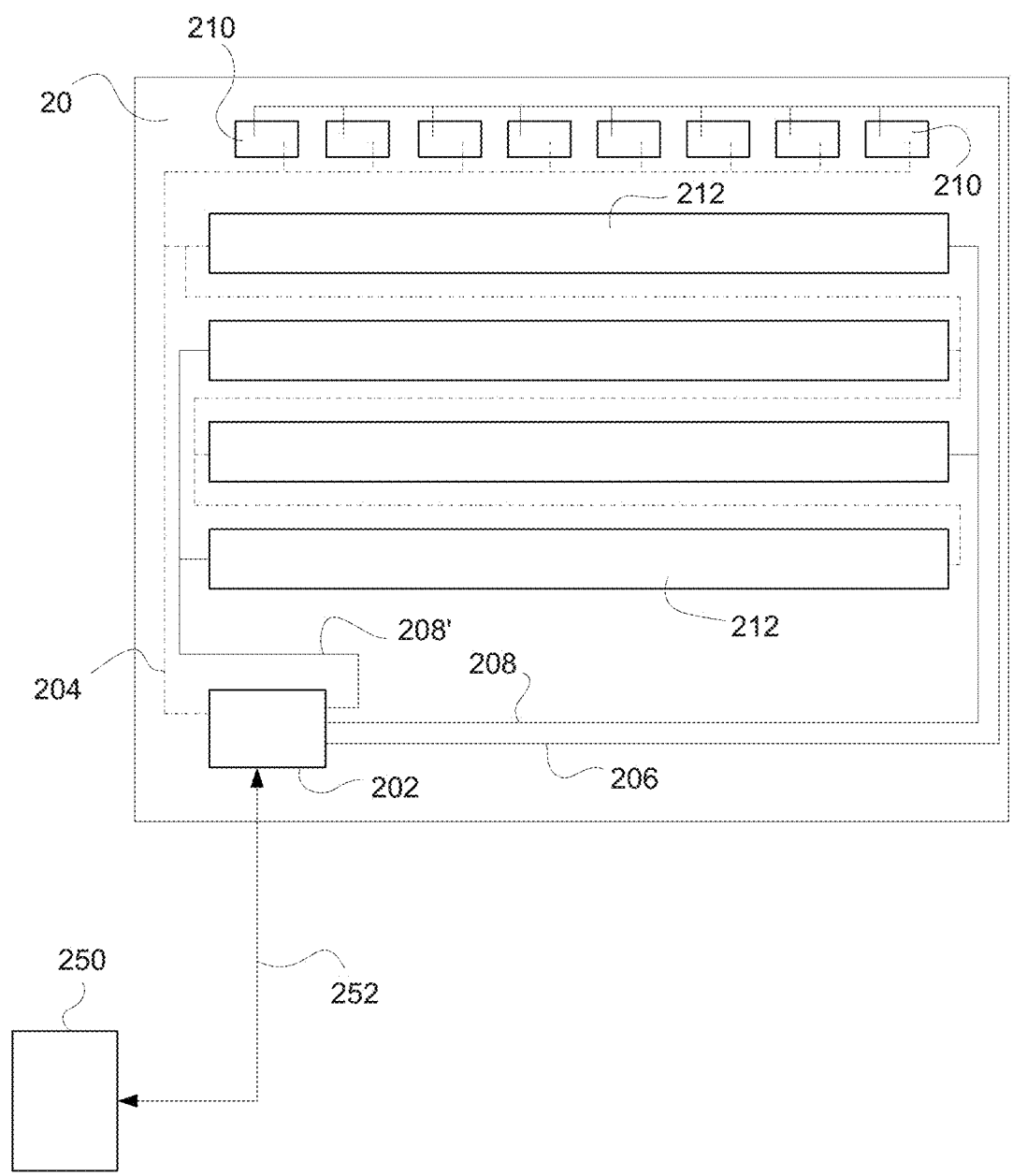
FIG. 4 is an exemplary diagram of the electrical contact system according to FIG. 1.

Referring now to FIG. 4, an example wall with nanowire heating and contact elements is depicted. A low voltage ("LV") DC power source/controller 202 is provided which plugs into an available power outlet. Typically, "low voltage" is considered about 24V, but would be less than 48V. It is understood that different step down voltages could be incorporated as needed depending on the application. This power source/controller 202 includes contacts thereon, which connect to the nanowire elements 204, 206, 208, 208' to the various elements of the controlled system. As can be seen the nanowire elements are generally configured as elongated stripes that are connected to various electrically-powered elements for control thereof via the power source/controller 202. Stripe 204 is shown as the common or negative element for current flow. This stripe may be thicker/wider than the others in some configurations to allow for additional or additive current to flow. Contact area 210 is provided where stripe 204 and 206 are close but do not meet. Power to the heating elements 212 is supplied both by stripes 208, 208'. The controller 202 includes three separate contacts 222, 224, 226 (FIG. 8), where each of the contacts can be separately controlled. Thus, LED light fixtures could be controlled by circuit contact 222 and the heating could be separately controlled via contacts 224, 226 via switching/current/voltage regulators provided within the controller 202.

Also shown in FIG. 4 is computer 250 that is coupled to controller 202 via a network connection 252. This connection can comprise any type of connection as previously described, including for example, a wired or wireless Internet connection to a remote location for remote monitoring and/or control.

Figure 5:
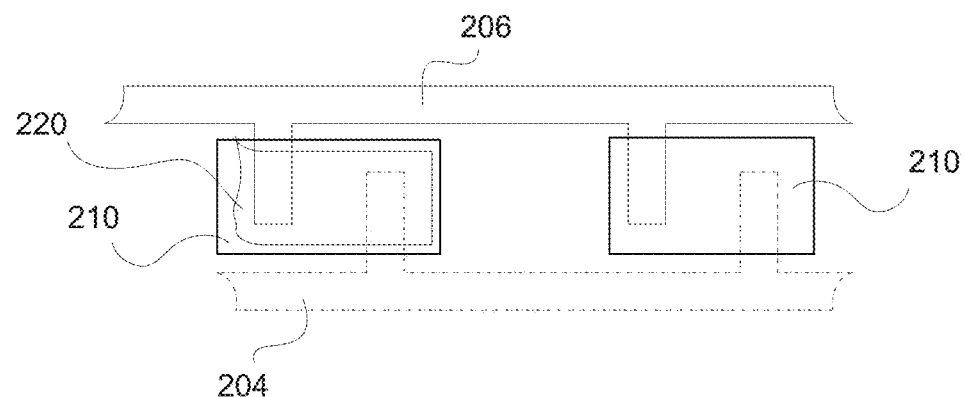
FIG. 5 is a detail view of FIG. 4 in one embodiment.
Figure 6:
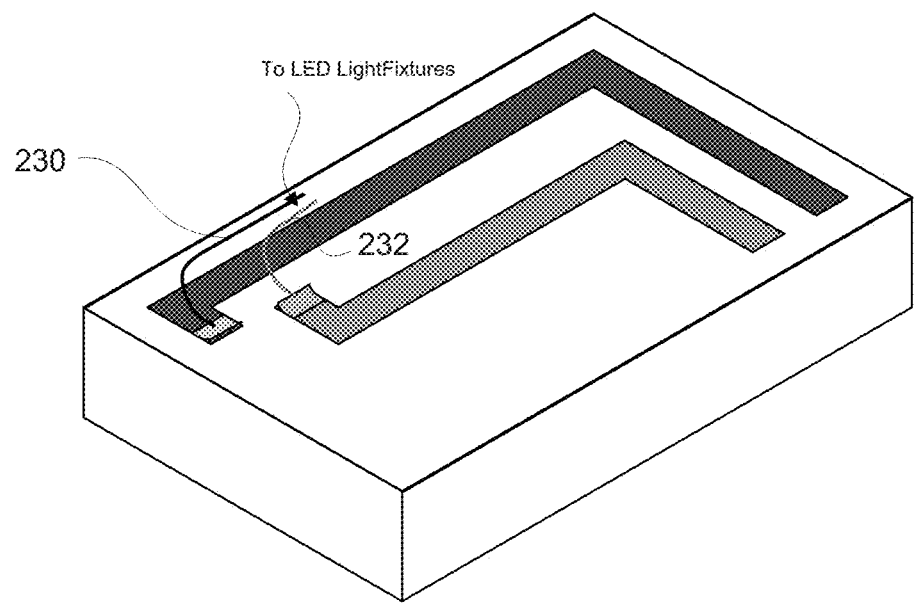
FIG. 6 is a detail view of FIG. 4 in with an electrical connection for a light attached.

The contact area 210 is shown in further detail with regards to FIG. 5. As can be seen, the stripes 204, 206 terminate at the contact area 210. A protective element 220 is supplied to cover the end of the stripes 204, 206 so that additional layers can be placed on top of the nanowire stripes. For example, protective element 220 may be a piece of masking tape or other similar tape that is applied once the stripes 204, 206 have dried/cured. The nanowire stripes may be coated or covered with a protective/insulated element and then the whole wall and strips may be painted over to give the desired finish and decorative look. The protective element 220 is removed to expose the stripes 204, 206 so that leads can be attached. FIG. 6 shows leads 230, 232 attached to the stripes. For example, a metallic tape with conductive adhesive is applied to the nanowire stripe. This tape may be a copper foil tape with conductive adhesive in some embodiments. Alternately, a light or other electrical device may include conductive backings similar to what is shown with regards to the controller/power source 202. In such an embodiment, the light fixture would be screwed/attached to the wall such that the conductive backings contact the stripe to create the required circuit. In the embodiment shown in FIG. 6, two leads 230, 232 extend to the light fixture, which may be an LED light fixture. Normally, these are powered by low voltage direct current.

Referring now to FIGS. 7-9, the controller/power source 202 is shown in further detail. The controller/power source 202 may be connected to wifi/Bluetooth or other communications to enable the power source and the elements connected thereto to be controlled. The power source 202 may include a voltage step down and AC to DC converter. In FIG. 8, the power source/controller 202 is shown upside down and includes an outlet 14. Screw 15 passes through its corresponding hole and attaches to outlet 14 in the same manner as normally used to attach a face plate. In some embodiments, the face place is removed, in others, the housing of the power source/controller 202 fits over the wall plate. Contacts 222, 224, 226 are positioned on the rear face (when installed) of the controller/power source 202 and as shown in FIG. 9, these may be strips of bent metal that act as springs to apply force against the strips 206, 208, 208'. Although not shown, additional contacts may be provided on the left side, for example, a contact to connect to strip 204 to complete the circuit.

The controller/power source 202 may include communications hardware to enable communications with various sensors. For example, wifi, radio or BLE (Bluetooth low energy) communications or similar may be used. A temperature sensor may be included with the system, for example on the controller/power source 202 to monitor the temperature of the strips 204, 206, 208, 208'. Temperature sensors may be placed in alternative locations such that power can be cut off or reduced if the temperature becomes too high or exceeds a threshold level.

Figure 10:
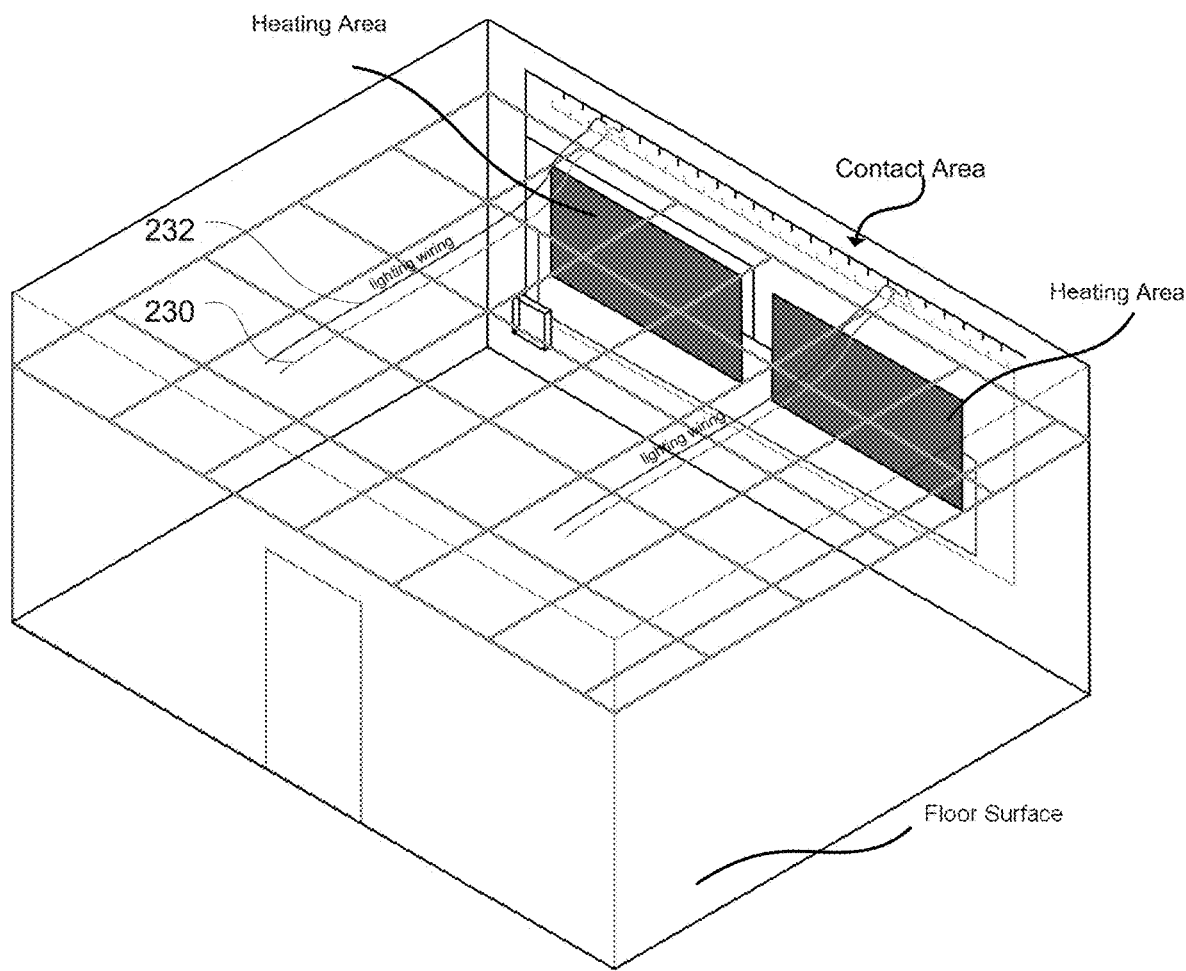
FIG. 10 a perspective three-dimensional diagram of the electrical contact system of FIG. 1 as shown in its larger room.

Referring to FIG. 10, the wall of FIG. 4 is shown within an overall room with a slightly modified configuration of the heating area. The lighting wiring 230, 232 may extend within the drop ceiling to connect to overhead lights in the ceiling. Although not shown, wall based lights such as sconces and the like may be attached to the wall contact area. It is understood that connection of other electrically powered elements can be made via the contact system described herein and that application thereof is not limited to walls. The nanowire strips can be applied on any appropriate surface(s) to create electrical connections to wherever needed.

Figure 11:
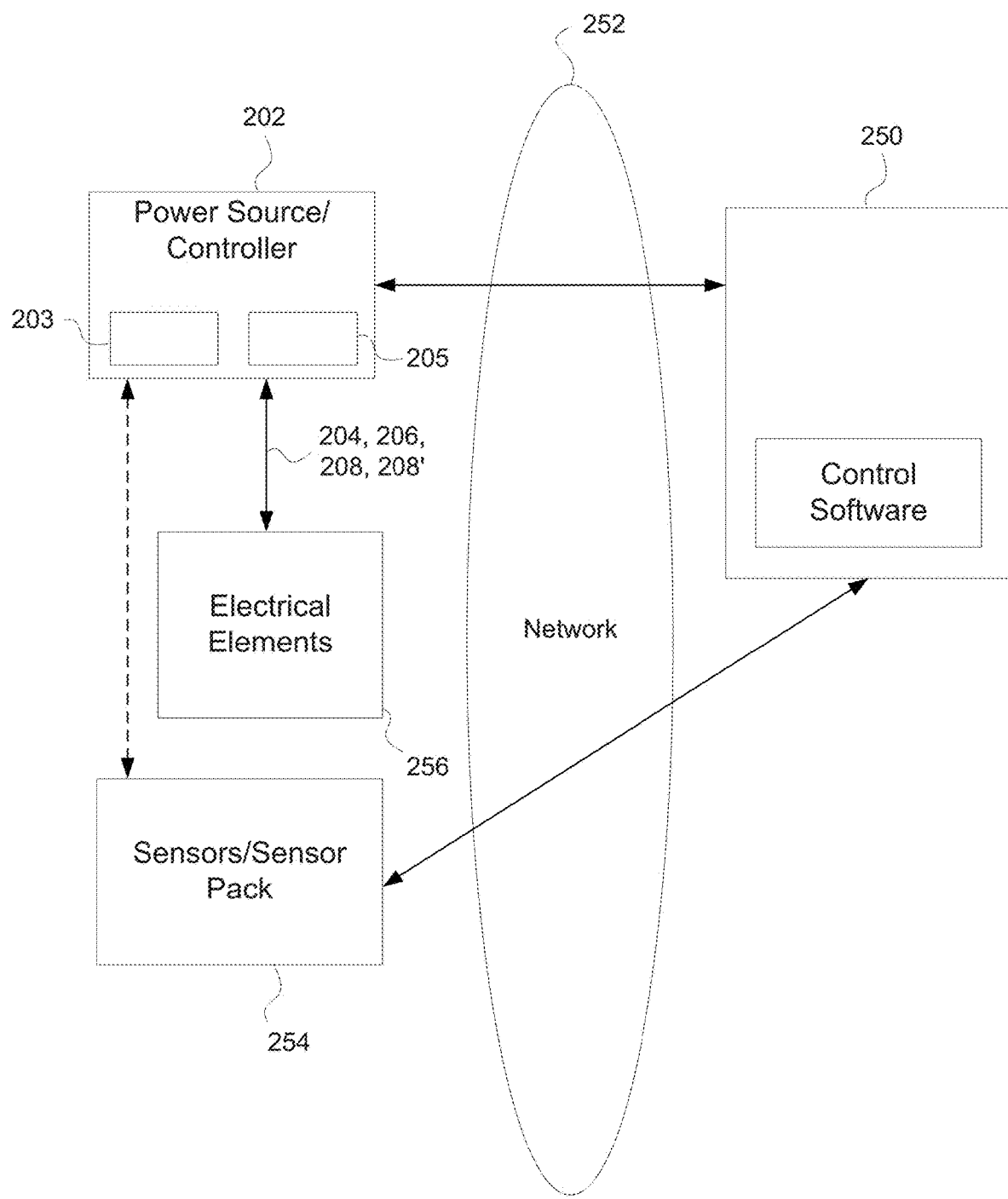
FIG. 11 is a functional flow diagram according to one implementation of the contact system of FIG. 4.

In FIG. 11, an example of how the controller/power source 202 and the contact system becomes part of an overall building control system. As shown in FIG. 11, the power source/controller 202 is connected to a computer 250 via a network 252. Power source/controller 202 further comprises a processor 203 and a storage 205. Storage 205 may include a program saved thereon, which can be executed by processor 203.

As shown in the other figures, the power source/controller 202 is connected to the electrical elements 256 via the nanowire connections (204, 206, 208, 208') described herein. The electrical elements 256 may include LED light fixtures or other devices, as well as nanowire-based heating elements as depicted in FIG. 4.

The sensor/sensor pack 254 either communicates with the power source/controller 202 or via the network or both, depending on the desired configuration. Although a computer 250 is shown, it is also understood that switches and other electrical control elements can be used. In the example of a switch, another contact area would be created in the location where the switch is desired and the switch would be installed to enable electrical elements to be turned On/Off.

In terms of using nanowire to power things themselves, it is now possible to run virtual connections that are almost invisible along walls, or along circuit boards or the interior of devices themselves to power any and all components to either a battery or a DC adaptor plug. Appliances can now remove all internal wiring completely, reducing space, removing faulty breakage, and improving safety. This method should be more efficient to manufacture devices as any and all wiring can simply be applied through an automated coating process to connect internal components.

It would even be possible to more efficiently power many if not all electrical systems within an automobile, or Snowmobile, or boats, planes, or any vehicles at all that run electrical wiring to power components. The removal of many if not all wiring should reduce breakage, warranty, and reduce required spaces that often are required cavities to run necessary wiring to power things in many types of vehicles.

In nanowire heating applications, the connection required for nanowire-based heating requires full coverage of two sides of a rectangle or square with the positive on one side and the negative on the opposite side. The space in between is coated with a layer of microscopic Nano material mixed with a variety of possible surfactants or paint like fluids which can be applied in a number of ways. The current spreads over this sheet from the positive to the negative side and creating an efficient radiant heat device. The positive and negative connection would normally comprise a pair of wires, one for positive and one for negative. In this implementation, channels of the nanowire layer simply need a positive and negative source of power to be at the beginning of the painted layer. The width of the layer may be variable depending on how much current is required at the source. Again, it is expected that the current used would be DC to insure safety, although this disclosure includes AC running along the nanowire connection layer as well. AC may require an insulative coating to cover the nanowire layer for safety reasons depending on the amount of power it carries. By using a combination of the nanowire to power the heating elements, many applications are envisioned, including but not limited to the following:

Cloth based heating solutions including: Heated car seats—A cloth or flexible material can be coated or dipped in nanowire coating material, and connected with either wires, or using nanowire material to connect to take up little to no space on a seat. The same concept would apply to a snowmobile seats, or any seating places where heat is needed. Similar theories apply to winter clothing, interior of boots can more easily be heated using batteries and the nanowire material.

Rugs could be milled and connected in a similar manner and provide radiant floor heat. Underflooring can easily be coated with a flat coated material or cloth applied with nanowire material, and connected as described herein at the walls then connected to a DC or AC source through conversion. On flooring the nanowire material may be located beneath the upper (or decorative) layer of flooring to reduce or remove damage of the Nano material by direct contact and wear and tear. Moldings comprising wood, plaster or plastics could be coated with the nanowire material and powered using the connection system described herein.

Windows can be coated with nanowire material to cause the window to emit heat inside a building. This would provide a double benefit of acting as a heater and as an infrared radiant insulator.

An example of only some of the electronics devices that be revolutionized by nanowire based connections include but are not limited to: Flashlights; Mobile devices, (i.e. phones, iPods, headphones, etc.); Stereos; Auto electronics; Computers, iPads; Screens, TV's, Projectors; Boots, gloves, and so on that could generate heat; An Apple Watch could use sensors to depict temperature of the body potentially triggering a wireless turn on of the heating element in boots or gloves or helmets to balance comfort with need and retain battery power for a full day.

In another concept, wireless charging could be enabled through use of the nanowire material. Today, our mobile devices and almost any electronic devices have a charging requirement. Lithium batteries now power many things, and the need to charge them is getting more frequent. Rather than finding plugs to charge these many devices, new surface chargers have emerged recently that enable a special cover for the devices to take a charge by contacting a charged surface. These existing charging surfaces use standard coil based technology, as well as wires that power them. The current system simplifies this approach further, by enabling the application of a nanowire coating on a surface, like a desk or counter top, and the connection approach for powering as described herein, the surface can be powered with positive and negative currents. A standard shape and position of the positive and negative side would need to be shaped and a special receiver of this surface charging would need to be created in mobile phone covers, or the base of a laptop to enable a much better and more convenient system than exists today with wires and plugs. Furniture companies would be able to offer standard charging spots and enhanced flexibility could be applied to the manufacturing process as no special coils or electrical wiring would need to be utilized. The aesthetics would not be altered significantly unless a special design was desired to outline these spots.

This method of charging convenience might apply to many charging products opening battery power functionality in places it has not existed before, such as the floor of a garage where an electric car is parked for automatic charging capability. A full wall may be allocated to charging all devices in the room for example. There may even be a day where a road is charged for persistent electric car charging removing the need for any charging at all.

Figure 12:
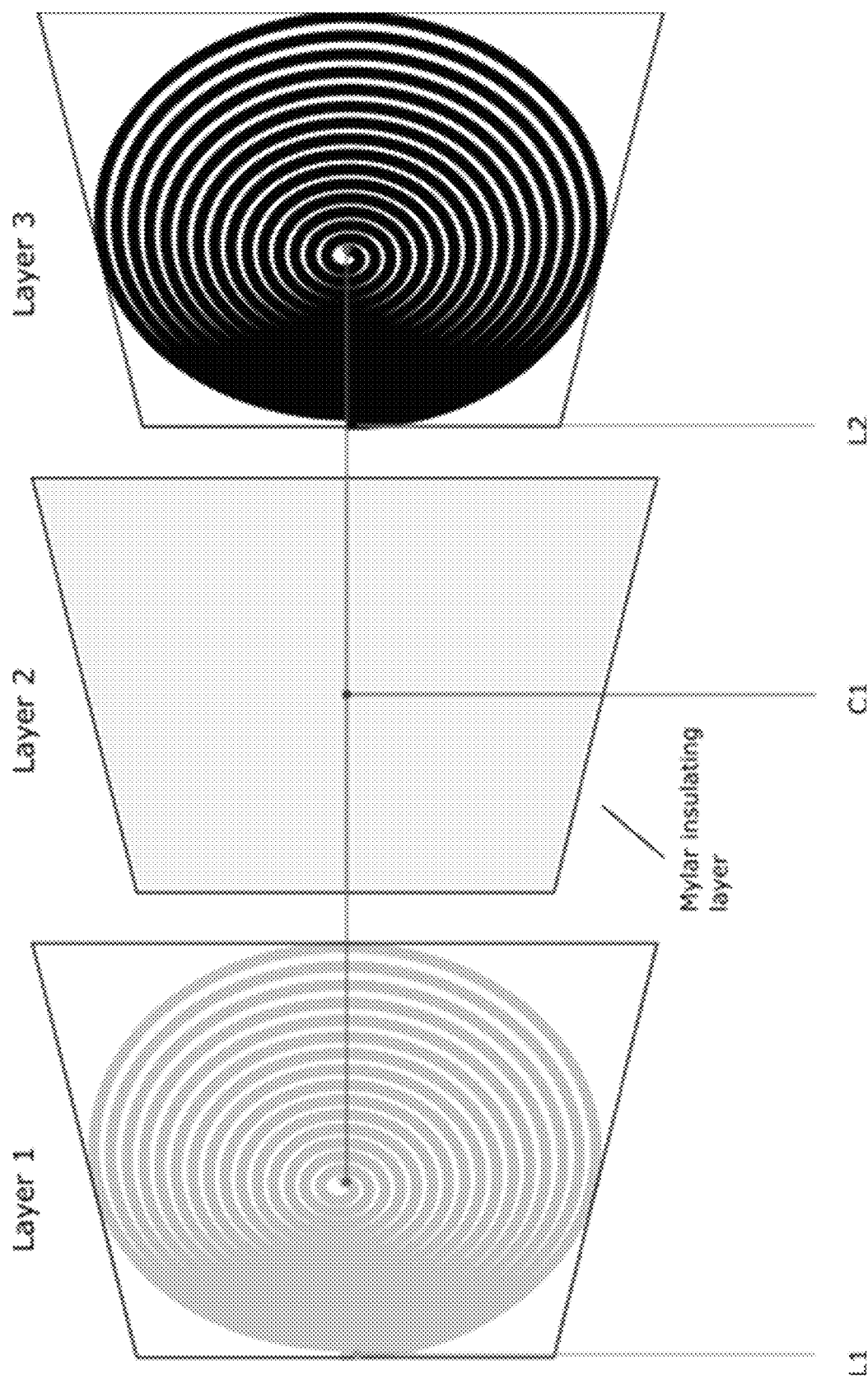
FIG. 12 is spiral configuration for a charger according to FIG. 1.

By utilizing silver nanowire pattern in a spiral shape as shown in FIG. 12, the configuration will allow for a coil to be created that is extremely thin and can be easily applied to a surface where the coil will act as an inducer for wireless energy transfer applications such as wireless charging of mobile devices, wireless lighting applications, and many other applications where wireless energy delivery could be advantageous.

The principal advantage of using silver nanowire for this application is that by using a three-layer design (FIG. 12) an induction coil can be made very thin (approximately 0.010 inch). By applying the silver nanowire spiral design pattern on one side of a plastic material (layers 1 and 3) and using a through hole to connect layers 1 and 3 and provide a center tap (C1 in FIG. 12) for connectivity to the oscillator/driver circuit. Since each layer is made of a thin plastic material the induction coil can be easily affixed to other rigid or semi rigid surfaces.

Additionally, since layers 1 and 3 are made from a nonconductive plastic material (approximately 0.0025 in thickness) it is possible that layer 2 could be eliminated, thus decreasing the overall thickness of the inducing coil. (FIG. 12)

Based on the application, the diameter of the spiral design can vary anywhere between 0.75 in and several feet. The number of spiral revolutions can also vary, so as to maintain an inductance of approximately 20 µH. The test circuit below is a Hartley oscillator designed to operate at approximately 567 kHz. The oscillation frequency of the circuit below is established by the values of C3 and L1 using the following formula:

$$F = \frac{1}{2\pi\sqrt{LC}} \qquad \text{Formula 1}$$

It should be noted however, that other oscillator configurations could effectively be utilized as per the requirements of the underlying wireless energy transfer application.

Figure 13:
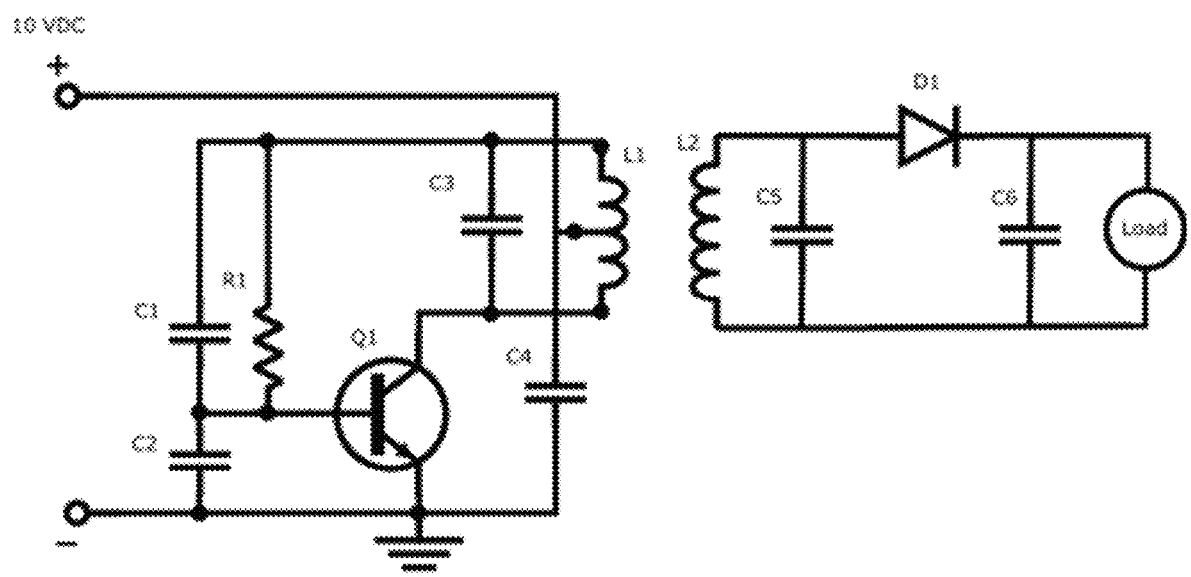
FIG. 13 is a schematic diagram of a circuit for the system according to FIG. 12.

FIG. 13 is a circuit for conductive nanowire—inductive energy transfer circuit that could be used with the spiral configuration discussed in connection with FIG. 12, where: C1=470 pF, C2=470 pF, C3=4.7 nF, C4=470 nF, C5=4.7 nF, C6=220 nF, D1=1N4148, R1=15 kΩ ¼ W, Q1=2N3020.

Although the invention has been described with reference to a particular arrangement of parts, features and the like, these are not intended to exhaust all possible arrangements or features, and indeed many other modifications and variations will be ascertainable to those of skill in the art.

The invention claimed is:

1. An electrical power distribution system adapted to be applied to a wall, a ceiling or a floor, the system comprising:
   a power source adapted to provide a Direct Current (DC) output to a device that is adapted to receive DC power from said power source;
   a plug extending from a face of the power source and configured to connect to an electrical outlet;
   a first conductive current path extending from a first connection area near said power source to a second connection area near the device, said first conductive current path comprising a liquid nanowire material directly applied upon a surface of the wall, the ceiling or the floor and combinations thereof such that the liquid nanowire material dries or cures directly on the surface;
   a second conductive current path extending from the first connection area to the second connection area, said second conductive current path comprising a liquid nanowire material directly applied upon the surface such that the liquid nanowire material dries or cures directly on the surface;
   the plug comprising a plurality of contact elements spaced apart and one of the plurality of contact elements configured to make electrical contact with the first conductive current path and another of the plurality of contacts configured to make electrical contact with the second conductive current path;
   said first and second conductive current paths maintained physically apart from each other; and
   said power source adapted to be connected to said first connection area and said device adapted to be connected to said second connection area such that DC power is supplied to said device via said first and second conductive current paths.

2. The system of claim 1 wherein said first and second conductive current paths of nanowire material are applied in an elongated strip on the surface of the wall, the ceiling or the floor or combinations thereof.

3. The system of claim 1 wherein said power source includes controller which is configured to communicate with a server via a network connection, the controller receiving commands to control the electrically powered element.

4. The system of claim 3 wherein said controller comprises a processor and a storage.

5. The system of claim 4 further comprising a transceiver in said power source adapted to receive data via a wireless connection.

6. They system of claim 5 wherein the wireless connection comprises a Bluetooth format.

7. The system of claim 3 wherein the commands are selected from the group consisting of: turn on, turn off, adjust power, dim, control color and combinations thereof.

8. The system of claim 1 further comprising:
   at least two contact strips applied to said second connection area, one at the first conductive current path and another at the second conductive current path; and
   a pair of wires connecting the at least two contact strips to said device.

9. The system of claim 1 wherein said power source includes an AC to DC converter.

10. The system of claim 1 wherein said plurality of contact elements are spring elements which exert a force on the first and second conductive current paths when the power source is attached to the electrical outlet.

11. The system of claim 1 wherein said nanowire material comprises silver nanowire.

12. The system of claim 1 wherein the device is a heater.

13. The system of claim 12 wherein when said heater comprises a spiral configuration.

14. A method of providing electrical power to a device positioned on a wall, a ceiling or a floor comprising the steps of:
   while in a liquid phase, applying a liquid nanowire material directly to a surface of the wall, the ceiling or the floor or combinations thereof forming at least a first and a second conductive current path where each current path extends from a first connection area to a second connection area;
   connecting a first electrical contact of a power source to the first conductive current path at the first connection area and connecting a second electrical contact of the power source to the second conductive current path at the first connection area;
   a plug extending from a face of the power source and configured to connect to an electrical outlet and the plug comprising a plurality of contact elements spaced apart and one of the plurality of contact elements configured to make electrical contact with the first conductive current path and another of the plurality of contacts configured to make electrical contact with the second conductive current path;
   connecting a first electrical contact of the device to the first conductive current path at the second connection area and connecting a second electrical contact of the device to the second conductive current path at the second connection area; and
   transmitting electrical power from the power source to the device;
   wherein the liquid nanowire material dries or cures on the surface.

15. The method of claim 14 further comprising the steps of:
   providing the power source with a controller;
   connecting the controller to a computer via a network connection;
   sending data to said controller via the network connection.

16. The method of claim 15 further comprising the step of:
   sending data to said computer via the network connection.

17. The method of claim 14 further comprising the steps of:
   applying a DC current to the first and second conductive current paths prior to the liquid material fully curing or drying.

18. The method of claim 14 further comprising the steps of:
   covering at least a portion of the first and second conductive current paths with a coating.

19. The method of claim 14 wherein the liquid material comprises silver nanowire.

20. An electrical power and distribution system adapted to be applied to a wall, a ceiling or a floor, the system comprising:
   a power source adapted to provide electrical power to a device that is adapted to receive electrical power;

a plug with prongs extending from a face of the power source and configured to connect to an electrical outlet by insertion of the prongs into the electrical outlet;

a plurality of contact elements located on the face and spaced apart such that when installed, one of the plurality of contact elements makes electrical contact with a first conductive current path and another of the plurality of contacts makes electrical contact with a second conductive current path to create an electrical circuit from the electrical outlet, through the plug, through the power source and to the first and second conductive current paths;

the first conductive current path extending from a first connection area near said power source to a second connection area near the device, said first conductive current path comprising a liquid silver nanowire material directly applied upon a surface of the wall, the ceiling or the floor and combinations thereof; and the second conductive current path extending from the first connection area to the second connection area, said second conductive current path comprising a liquid silver nanowire material directly applied upon the surface;

said power source adapted to be connected to said first connection area and said device adapted to be connected to said second connection area such that electrical power is supplied to said device via said first and second conductive current paths.

21. The system of claim 20 wherein the device is a heater.

22. The system of claim 20 wherein said power source includes an AC to DC converter.

23. The system of claim 20 wherein said power source includes controller which is configured to communicate with a server via a network connection, the controller receiving commands to control the electrically powered element.

24. The system of claim 23 wherein said controller comprises a processor and a storage.

25. The system of claim 24 further comprising a transceiver in said power source adapted to receive data via a wireless connection.

26. The system of claim 25 wherein the wireless connection comprises a Bluetooth format.

27. The system of claim 1 wherein the device is an LED light fixture.

28. The method of claim 14 wherein the device is an LED light fixture.

29. The system of claim 20 wherein the device is an LED light fixture.

* * * * *